(12) United States Patent  (10) Patent No.: US 7,750,941 B2
Sakamoto et al.  (45) Date of Patent: Jul. 6, 2010

(54) ELECTRONIC CAMERA AND RECORDING AND REGENERATING METHOD

(75) Inventors: Koichi Sakamoto, Asaka (JP); Makoto Tsugita, Asaka (JP)

(73) Assignee: Fujifilm Corporation, Tokyo (JP)

(*) Notice: Subject to any disclaimer, the term of this patent is extended or adjusted under 35 U.S.C. 154(b) by 451 days.

(21) Appl. No.: 11/802,511

(22) Filed: May 23, 2007

(65) Prior Publication Data

US 2007/0257994 A1 Nov. 8, 2007

Related U.S. Application Data

(62) Division of application No. 09/614,919, filed on Jul. 12, 2000, now abandoned.

(30) Foreign Application Priority Data

Jul. 12, 1999 (JP) .................. 11-197750

(51) Int. Cl.
*H04N 5/225* (2006.01)
*H04N 9/04* (2006.01)

(52) U.S. Cl. .............. 348/207.99; 348/231.99; 348/231.4; 348/552; 348/231.3; 348/231.5

(58) Field of Classification Search ........... 348/207.99, 348/231.99, 231.4, 552, 231.3, 231.5; 358/906, 358/909.1; 396/429
See application file for complete search history.

(56) References Cited

U.S. PATENT DOCUMENTS

| 4,425,586 | A |   | 1/1984  | Miller          |        |
|-----------|---|---|---------|-----------------|--------|
| 5,130,812 | A |   | 7/1992  | Yamaoka         |        |
| 5,134,660 | A |   | 7/1992  | Larose          |        |
| 5,220,433 | A |   | 6/1993  | Mogamiya et al. |        |
| 5,610,723 | A |   | 3/1997  | Yamagishi       |        |
| 5,657,074 | A |   | 8/1997  | Ishibe et al.   |        |
| 5,726,708 | A |   | 3/1998  | Sakai et al.    |        |
| 5,812,736 | A | * | 9/1998  | Anderson        | 386/96 |
| 5,982,981 | A |   | 11/1999 | Satoh           |        |
| 6,774,939 | B1|   | 8/2004  | Peng            |        |
| 2002/0054218 | A1 | | 5/2002 | Kobayashi et al.|        |

FOREIGN PATENT DOCUMENTS

| JP | 9-106662  | A |   | 4/1997 |
|----|-----------|---|---|--------|
| JP | 09106662  | A | * | 4/1997 |

* cited by examiner

*Primary Examiner*—Yogesh K Aggarwal
(74) *Attorney, Agent, or Firm*—Birch, Stewart, Kolasch & Birch, LLP (57) ABSTRACT

Audio regeneration data indicating where sound during audio regeneration is stored is recorded in a recording medium together with captured image data when image-capturing. The image data recorded in the recording medium and the audio regeneration data is read during image regeneration process. The image is displayed in accordance with the image data while the sound during the image-capturing is regenerated in accordance with the audio regeneration data. Therefore, the image and the sound can be easily appreciated simultaneously and the image regeneration can be effectively enjoyed.

6 Claims, 10 Drawing Sheets

ELECTRONIC CAMERA AND RECORDING AND REGENERATING METHOD

CROSS REFERENCE PARAGRAPH

The present application is a Divisional of U.S. application Ser. No. 09/614,919, filed on Jul. 12, 2000, now abandoned and claims priority under 35 USC 119 to Japanese Patent Application Nos. 11-197750 filed on Jul. 12, 1999 the entire contents of which are hereby incorporated by reference.

BACKGROUND OF THE INVENTION

1. Field of the Invention

The present invention relates generally to an electronic camera and its recording and regenerating method, particularly to an electronic camera and its recording and regenerating method which can perform audio-regeneration and image-capture or image-regeneration simultaneously.

2. Description of Related Art

When regenerating an image which has been captured by an electronic camera for recording a still image and/or a moving image in a recording medium and simultaneously regenerating sound by linking audio data of another audio medium corresponding with the regenerated image, the user controls the audio regeneration of the audio medium while looking at the displayed image. However, by the conventional method, the user always has to control the audio regeneration of the audio medium, and in such case errors may occur during operation.

SUMMARY OF THE INVENTION

The present invention has been developed in view of the above-described circumstances, and has as its object the provision of an electronic camera and its recording and regenerating method in which sound that corresponds with a captured image is automatically regenerated so that the image and the sound can be easily appreciated simultaneously.

In order to achieve the above-described objects, the present invention is directed to an electronic camera, comprising: an imaging part which captures a subject image; a recording medium which records captured image data; and at least one of an audio regeneration device which regenerates sound and a communication device which communicates with an external device which performs audio regeneration, wherein when the subject image is captured, audio regeneration data which at least indicates where sound during audio regeneration is stored is recorded in the recording medium together with the captured image data.

According to the present invention, the audio regeneration data indicating at least where the sound during the audio regeneration is stored is recorded in the recording medium together with the captured image data when image-capturing. Thus, the sound corresponding with the captured image can be automatically regenerated, so that the image and the sound can be easily appreciated simultaneously.

Moreover, the present invention is directed to an electronic camera, comprising: an imaging part which captures a subject image; at least one of a display which displays an image in accordance with the image data recorded in the above-mentioned recording medium and an image signal output device which externally outputs an image signal in accordance with the image data recorded in the above-mentioned recording medium; and at least one of an audio regeneration device which regenerates sound and a communication device which communicates with an external device which performs audio regeneration, wherein the image data and the audio regeneration data recorded in the recording medium are read out, and the image is displayed in accordance with the image data while regenerating sound at image-capturing in accordance with the audio regeneration data.

According to the present invention, the sound corresponding with the image can be automatically regenerated in accordance with the audio regeneration data which is recorded in the recording medium; hence the image and the sound can be easily appreciated simultaneously.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder a preferred embodiment of an electronic camera and its recording and regenerating method of the present invention will be described in accordance with accompanying drawings.

Figure 1:
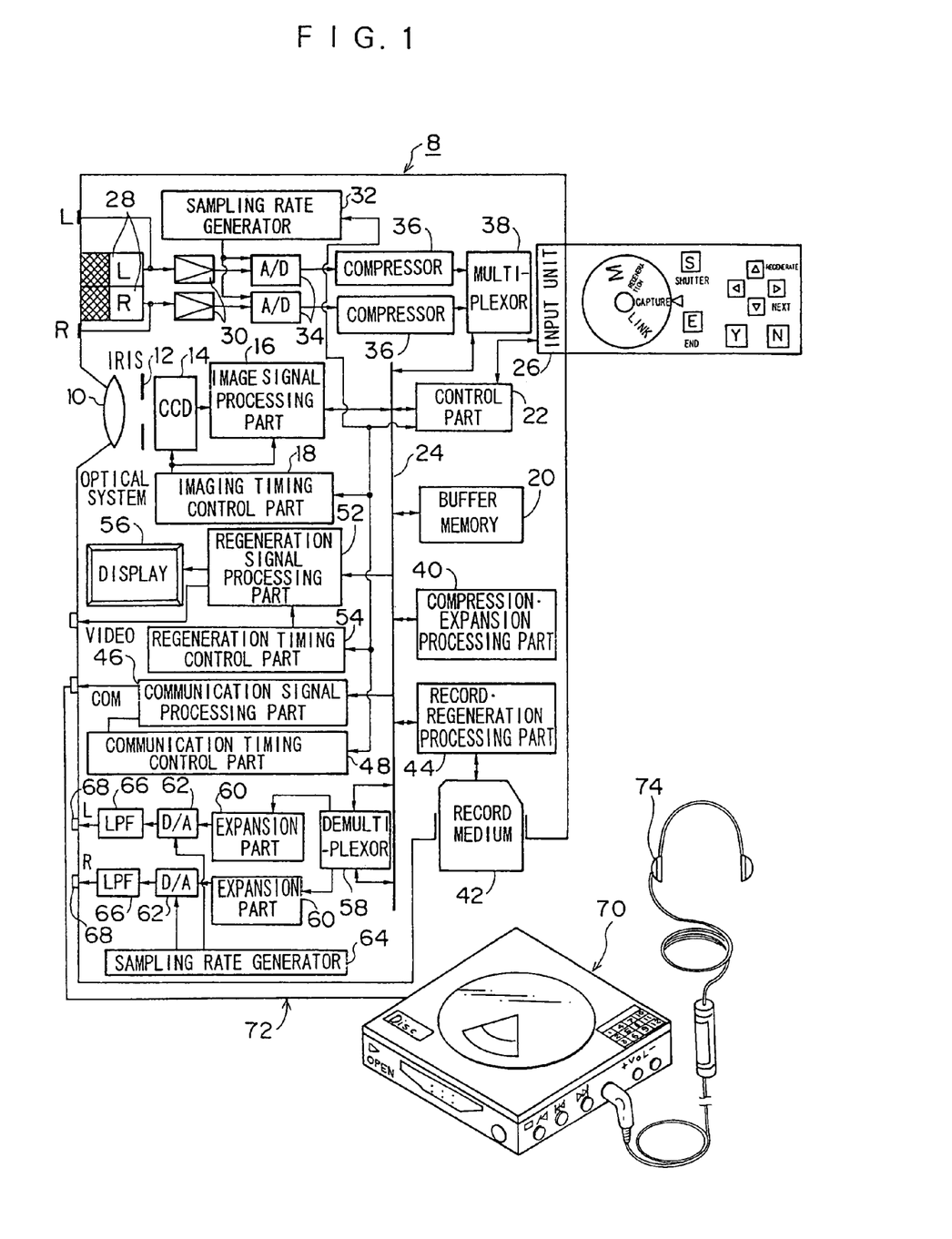
FIG. 1 is a block diagram showing an electronic camera according to an embodiment of the present invention.

FIG. 1 is a block diagram showing an electronic camera according to an embodiment of the present invention. An electronic camera 8 and an audio regeneration device 70 as external equipment are connected to each other through a communication line 72 in FIG. 1; however, the present invention is not limited to this configuration and the audio regeneration device 70 can be built in the electronic camera 8.

An optical system of the electronic camera 8 comprises a lens 10 which can adjust focus, an iris 12 for adjusting amount of light, and a solid-state imaging device (e.g., charge-coupled device: CCD) 14 for converting image into an electric signal. The image signal which is obtained by the CCD 14 goes through an analog process circuit and an A/D converter both of which are provided in an image signal processing part 16 so as to obtain digital R, G, and B signals.

The CCD 14 and the image signal processing part 16 are synchronized and driven by a timing signal which is outputted from an imaging timing control part 18. The timing signal outputted from the imaging timing control part 18 can be changed by an instruction from a control part 22, hence a frame rate and a number of pixels can be set without limitations. In addition to the above-mentioned features, the image signal processing part 16 performs the changing a size of an image, sharpness correction, gamma correction, contrast correction, white balance correction, and so forth.

The R, G, and B signals, outputted from the imaging signal processing part 16, are sequentially stored in a buffer memory 20 temporarily via a bus line 24.

The control part 22 can have a TTLAE function, in which brightness component of an image is extracted from obtained digital signal values of an image, a brightness level of a subject is obtained by integrating the brightness component with respect to a predetermined area, and an exposure power (iris and shutter speed) required for image-capturing is obtained from the brightness level of the subject.

In the inside of the control part 22, there are provided a RAM as a readable and writeable memory device (not shown) and a ROM which stores a program and fixed numbers that govern operations of the control part 22.

An input unit 26 of the electronic camera 8 is provided with a shutter button, a function switch, a cursor key, a determining switch, an image regeneration button, a NEXT button, an image regeneration end button, and so forth, all of which are not shown, and operation data of each is transmitted to the control part 22.

Audio record system of the electronic camera 8 comprises followings: microphones 28 and 28 for converting an audio signal into an electric signal, microphone amplifiers 30 and 30 for amplifying a feeble audio signal which is outputted from the microphones 28 and 28, a sampling rate generator 32 for producing a designated sampling rate which is instructed by the control part 22 and for generating the sampling rate, A/D converters 34 and 34 for sampling the audio signal in response to the sampling rate and converting the audio signal into digital data, compressors 36 and 36 for reducing an amount of the digital data, and a multiplexor 38 for combining right and left channels of the audio data and transmitting the data to the bus line 24.

The bus line 24 is provided with a compression-expansion processing part 40 and a recording-regenerating processing part 44. The compression-expansion processing part 40 compresses the image data and the audio data by a method such as MJPEG and MPEG, and expands the compressed data. The recording-regenerating processing part 44 converts the data in order to record/read out the image data and the audio data to/from a recording medium 42. The memory medium 42 may be a detachable memory medium such as a memory card and an MO. The recording medium 42 and the audio regeneration device 70 may be identical memory devices either detachable from or built into the electronic camera 8.

The electronic camera 8 is also provided with a communication signal processing part 46 and a communication timing control part 48. The communication signal processing part 46 transmits the image data and the audio data to external equipment through communication, and communicates with a connected audio regeneration device 70. The communication timing control part 48 controls a communication speed. In FIG. 1, the electronic camera 8 and the audio regeneration device 70 are connected to each other through the communication line 72; thus exchanging of data such as audio regeneration track number and a regeneration time, and bi-directional communication of a command signal and the like The audio regeneration device 70 is constructed to be able to perform audio regeneration by operating an operation button which is provided to the device itself. The audio regeneration device 70 can also transfer a command via the communication line 72 so as to automatically regenerate data.

In order to regenerate the image data recorded in the recording medium 42, the electronic camera 8 appropriately expands the data which is read out by the recording-regenerating processing part 44 at the compression-expansion processing part 40, and converts the data at a regeneration signal processing part 52 into a displayable signal and into a signal form which can be outputted to the outside in accordance with a timing signal which is outputted from a regeneration timing control part 54. The converted signal is transmitted to a display 56 and a captured image is displayed. The electronic camera 8 may output the image signal to the outside from the regeneration signal processing part 52 instead of displaying the image on the display 56.

In order to regenerate the audio data which is recorded in the recording medium 42, the audio regeneration device 70 appropriately expands the data which is read out by the recording-regenerating processing part 44 at the compression-expansion processing part 40, and separates the audio signals to respective channels at a demultiplexor 58 so as to transmit the data to data expansion parts 60 and 60. Each audio data which is expanded at the data expansion parts 60 and 60 is transmitted to D/A converters 62 and 62, and is converted into an analog audio signal according to the sampling rate data which is generated from a sampling rate generator 64. Then, the audio data is outputted through output terminals 68 and 68 to the external equipment after quantization distortion of the data is attenuated by low-pass filters 66 and 66.

Now a description will be given on an image-capturing process of the electronic camera 8 which is constructed as described above.

An image to be captured is formed on a light receiving face of the solid-state imaging device (CCD) 14 via the taking lens 10 and the iris 12. The subject image is photoelectrically converted into a charge signal at each sensor in the CCD 14 by an amount corresponding with an amount of an incident light.

A timing signal is outputted from the imaging timing controller 18 whereby the charge signal which is accumulated in the CCD 14 is successively outputted, and processes such as amplifying the R, G, and B signals of the image data at the image signal processing part 16, decreasing noise, and converting the data into digital data, are performed.

The control part 22 temporarily stores the image data which is converted into the digital data in the buffer memory 20. The image data, stored in the buffer memory 20, is appropriately extracted and successively transferred to the regeneration signal processing part 52 then displayed on the display 56.

In the audio record system, the feeble audio signals which are outputted from the microphones 28 and 28 are amplified by the microphone amplifiers 30 and 30, and the sampling is performed on the audio signals by the predetermined sampling rate so as to convert the signals into digital data. The amount of the digital data is compressed by the data compression parts 36 and 36 and the right channel and the left channel of the audio data are combined by the multiplexor 38, then the data is transmitted to the bus line 24.

The electronic camera 8 is set in a mode to record the subject image if a shutter button which is provided to the input unit 26 is pressed by the user. Then the control part 22 successively records the image data which is temporarily stored in the buffer memory 20 and the audio data which is obtained from the multiplexor 38.

Figure 2:
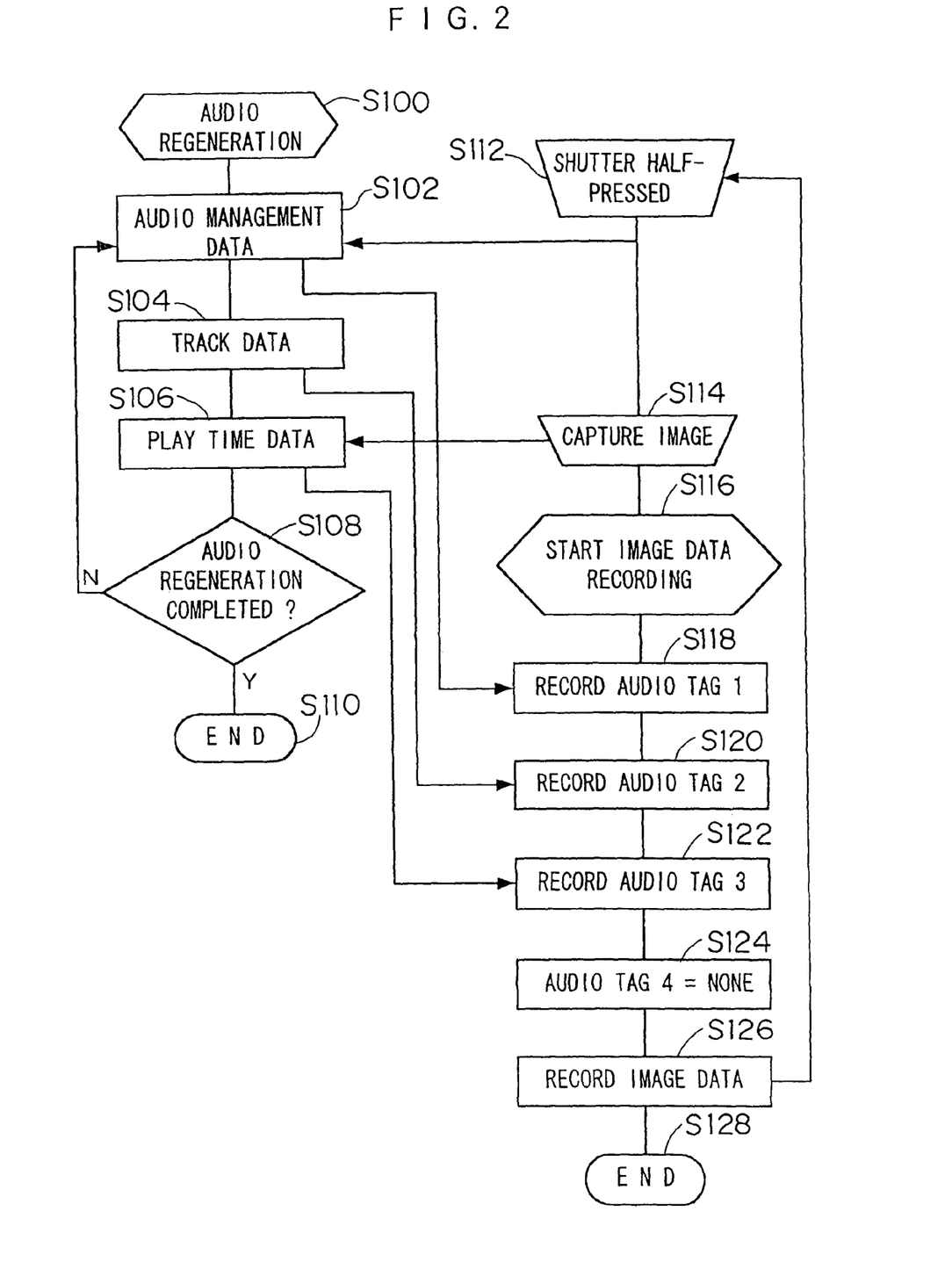
FIG. 2 is a flowchart showing a process for capturing an image by using the electronic camera and its recording and regenerating method according to an embodiment of the present invention.

FIG. 2 is a flowchart showing a process for capturing an image during the audio regeneration by using the electronic camera and its recording and regenerating method according to the embodiment of the present invention. As the image-capturing mode is designated in the electronic camera 8, the program jumps to a sub routine in FIG. 2.

In a step S100 "AUDIO REGENERATION" in FIG. 2, when a "REGENERATION BUTTON" which is provided to the audio regeneration device 70 is pressed, the program proceeds to S102 "AUDIO MANAGEMENT DATA", S104 "TRACK DATA", and S106 "PLAY TIME DATA." The program then executes reading out the audio management data such as date and title during regeneration, track data in which regenerating audio data is recorded, and play time data from the audio recording medium.

The program then proceeds to S108 "AUDIO REGENERATION COMPLETED?", and determines whether or not completion of the audio regeneration is designated. If the completion of the audio regeneration is not designated at S108, the program returns to S102. If the completion of the audio regeneration is designated, the program proceeds to S110 "END", and finishes the routine for audio regeneration, then returns to the original routine.

When half-pressing the shutter button which is provided to the input unit 26 at S112 "SHUTTER HALF-PRESSED", the program proceeds to S114 "CAPTURE IMAGE" and waits until the shutter button is fully pressed. The control part 22 of the electronic camera 8 starts communicating with the audio regeneration device 70 with respect to the communication signal processing part 46, and executes a process to receive the audio management data such as date and title which are read by the audio regeneration device 70 from the audio recording medium, track data in which the regenerating audio data is recorded, and the play time data. The received data is temporarily stored in the memory device (RAM) which is provided in the control part 22.

When the shutter is fully pressed at S114 "CAPTURE IMAGE", the program proceeds to S116 "START IMAGE DATA RECORDING", and goes on to a process for recording the captured image data to the recording medium 42.

At S118 "RECORD Audio Tag 1", the audio management data which is received from the audio regeneration device 70 together with the captured image data is recorded to the recording medium 42 as "Audio Tag 1".

At S120 "RECORD Audio Tag 2", the track number data which is received from the audio regeneration device 70 together with the captured image data is recorded to the recording medium 42 as "Audio Tag 2".

At S122 "RECORD Audio Tag 3", the play time data which is received from the audio regeneration device 70 together with the captured image data is recorded to the recording medium 42 as "Audio Tag 3".

At S124 "Audio Tag 4=NONE", the regeneration track order data is recorded together with the captured image data; however, nothing is recorded in the regeneration track data when the image is captured during the audio regeneration like the case of this embodiment.

Next, at S126 "RECORD IMAGE DATA", the captured image data is recorded to the recording medium 42. If the image-capturing mode is released, the program proceeds to the next S128 "END", and this image-capturing routine is completed. In a case where the shutter is half-pressed without releasing the image-capturing mode, the program returns to S112 and again prepares for image-capturing.

Figure 3:
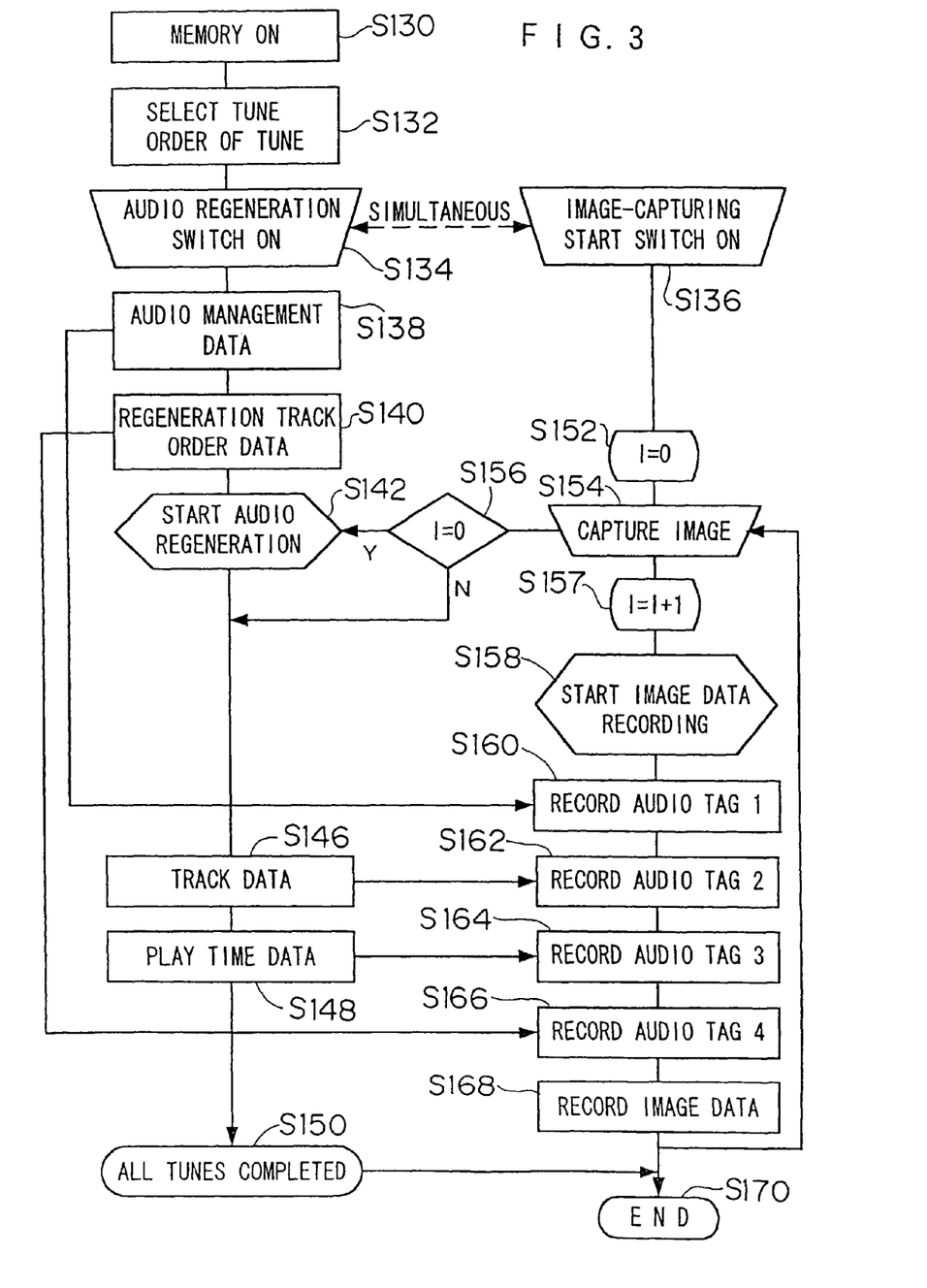
FIG. 3 is a flowchart showing a process for capturing an image considering a link with audio regeneration by using the electronic camera and its recording and regenerating method according to an embodiment of the present invention.

FIG. 3 is a flowchart showing a process for recording an image while considering a link with the audio regeneration by using the electronic camera and its recording and regenerating method according to an embodiment of the present invention. When a link recording mode is designated in the electronic camera 8, the program jumps to the routine in FIG. 3.

At S130 "MEMORY ON" in FIG. 3, a "MEMORY" switch of the audio regeneration device 70 is pressed, so that the audio regeneration device 70 is in a mode to set a tune and an order of tune to be regenerated.

At S132 "SELECT TUNE AND ORDER OF TUNE", an operation button of the audio regeneration device 70 is operated so as to program the tune and the order of tune to be regenerated.

The program proceeds to S134 "AUDIO REGENERATION SWITCH ON" and S136 "IMAGE-CAPTURING START SWITCH ON", so that the regeneration switch which is provided to the audio regeneration device 70 and the image-capturing start switch which is provided to the electronic camera 8 are pressed simultaneously.

An execution program for the audio regeneration device 70 proceeds to S138 "AUDIO MANAGEMENT DATA" and S140 "REGENERATION TRACK ORDER DATA", and executes a process to read out the audio management data such as date and title during regeneration and the audio track order data to be regenerated.

The program then proceeds to the next S142 "START AUDIO REGENERATION" and waits for an image-capturing start data from the electronic camera 8. In a case where the image-capturing start data is obtained from the electronic camera 8, the program proceeds to S146 "TRACK DATA" and S148 "PLAY TIME DATA", and executes a process to read out the track data to which the regenerating audio data is recorded and the play time data.

After that, the program proceeds to S150 "ALL TUNES COMPLETED". If the audio regeneration of all tunes is completed, the program proceeds to S170 "END" and returns to the original routine after ending the routine for the audio regeneration.

On the other hand, an execution program for the electronic camera 8 proceeds to S152 "I=0" when start of image-capturing is designated at S136. At S152, the program proceeds to S154 "CAPTURE IMAGE" after substituting 0 for a variable indicating a number of recorded image or images.

At S154, "I=0?" of S156 is determined. It is "I=0" if the electronic camera 8 is in a state before starting capturing the first frame; thus the electronic camera 8 instructs the audio regeneration at S142 of the audio regeneration device 70 via a communication part. If "I=0" is not determined at S156, the electronic camera 8 instructs at S146 to read out the track data during regeneration.

At S157 "I=I+1", in response to execution of capturing the first frame, a calculation is performed for adding 1 to the variable indicating the number of recorded image(s). Then, the program proceeds to S158 "START IMAGE DATA RECORDING", and the process moves on to recording of the captured image data to the recording medium 42.

At S160 "RECORD Audio Tag 1", the audio management data, received from the audio regeneration device 70, is recorded to the recording medium 42 as "Audio Tag 1" together with the captured image data.

At S162 "RECORD Audio Tag 2", the track number data, received from the audio regeneration device 70, is recorded to the recording medium 42 as "Audio Tag 2" together with the captured image data.

At S164 "RECORD Audio Tag 3", the audio play time data, received from the audio regeneration device 70, is recorded to the recording medium 42 as "Audio Tag 3" together with the captured image data.

At S166 "RECORD Audio Tag 4", the regeneration track order data, received from the audio regeneration device 70, is recorded to the recording medium 42 as "Audio Tag 4" together with the captured image data.

At S168 "RECORD IMAGE DATA", the captured image data is recorded to the recording medium 42. As the image-capturing mode is released, the program proceeds to S170 "END" and finishes the image-capturing routine. If the shutter is half-pressed without releasing the image-capturing mode, the program returns to S154 and again prepares for image-capturing.

Figure 4:
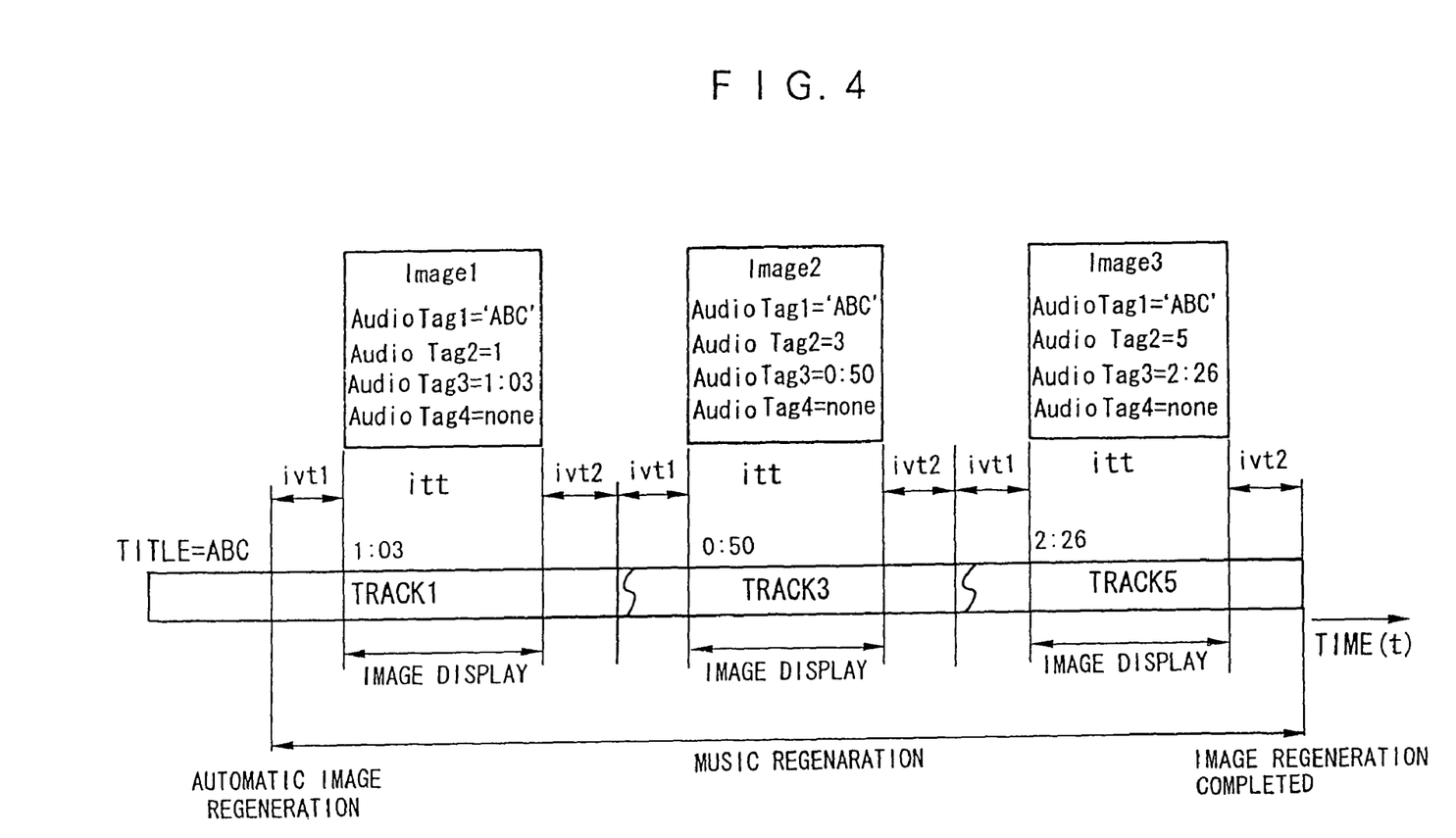
FIG. 4 is a timing chart showing a process for capturing an image during audio regeneration and for automatically regenerating the recorded image while automatically regenerating sound by using the electronic camera and its recording and regenerating method according to an embodiment of the present invention.
Figure 5:
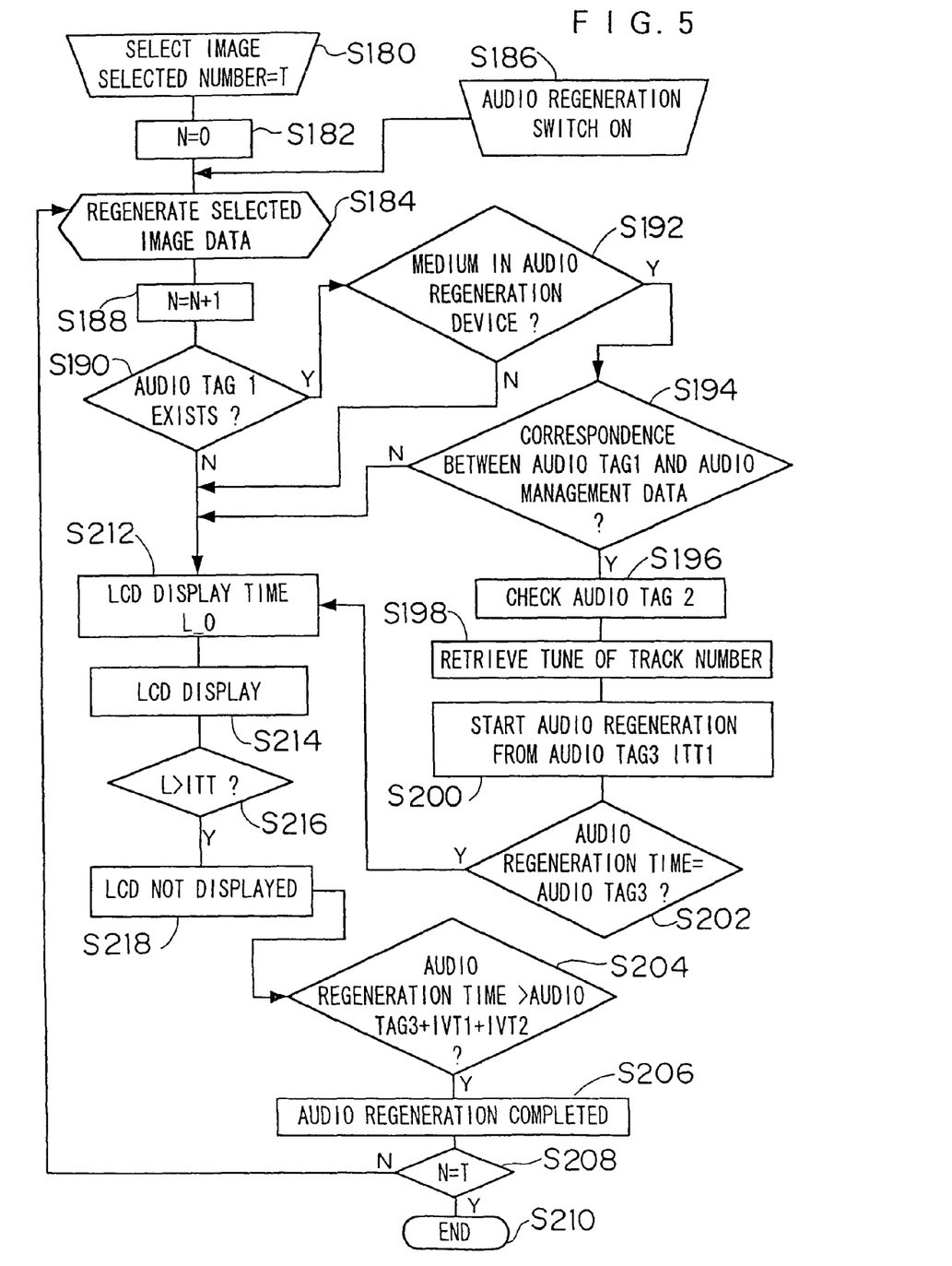
FIG. 5 is a flowchart showing the process for capturing the image during the audio regeneration and for automatically regenerating the recorded image while executing automatic audio regeneration by using the electronic camera and its recording and regenerating method according to the embodiment of the present invention.

FIG. 4 is a timing chart showing a process for capturing an image during the audio regeneration, and automatically regenerating the recorded image while performing automatic audio regeneration by using the electronic camera and its recording and regenerating method according to an embodiment of the present invention. FIG. 5 is a flowchart showing the process. As an image regeneration mode is designated in the electronic camera 8, the program jumps to the routine in FIG. 5.

In FIG. 4, data to be recorded in an image file of "Image 1" are a title "ABC" in the Audio Tag 1, a track number "1" at audio regeneration in the Audio Tag 2, and an audio play time "1:03" in the Audio Tag 3 together with the image data of "Image 1". A regenerating tune order data, also recorded in the "Image 1", is initially recorded in the Audio Tag 4, but nothing is recorded in the regeneration track data in a case where the image is captured during the audio regeneration. Similarly, the data mentioned above are recorded also in "Image 2" and "Image 3" and so on following "Image 1".

As regeneration of music of "track 1" is started, the image of "Image 1" is displayed after a predetermined background audio regeneration time ivt1. The image is displayed during an image display time itt, and the sound is simultaneously being regenerated. As the image display is completed, the audio regeneration of "TRACK 1" is completed after a predetermined background audio regeneration time ivt2, and the program moves on to the audio regeneration of "TRACK 3". The following regeneration of the image and sound are automatically performed in the same manner.

In FIG. 5, an image to be regenerated is selected at S180 "SELECT IMAGE, SELECTED NUMBER=T" while referring to a preview screen, then the program proceeds to S182 "N=0". At S182, 0 is substituted for the variable indicating the number of regenerated image or images.

When pressing the regeneration switch which is provided to the audio regeneration device 70 at S186 "AUDIO REGENERATION SWITCH ON", the execution program of the electronic camera 8 is advanced to S184 "REGENERATE SELECTED IMAGE DATA" via the communication part which is provided between the audio regeneration device 70 and the electronic camera 8.

At S184, an input from the image regeneration button provided to the electronic camera 8 is in a stand-by state. As the image regeneration button is pressed, regeneration and display of the image are started and the execution program proceeds to S188 "N=N+1", then 1 is added to the variable indicating the number of regenerated images.

At S190 "Audio Tag 1 EXISTS?", whether or not data is written in "Audio Tag 1" is determined. If it is determined that the data is written in "Audio Tag 1 " at S190, the program diverges to S192 "MEDIUM IN AUDIO REGENERATION DEVICE?", and the electronic camera 8 checks to the audio regeneration device 70 via the communication part whether or not the medium exists in the audio regeneration device 70. If the medium exists in the audio regeneration device 70, the program diverges to S194 "CORRESPONDENCE BETWEEN Audio Tag 1 AND THE AUDIO MANAGEMENT DATA", and the electronic camera 8 checks to the audio regeneration device 70 whether or not Audio Tag 1 and the audio management data correspond with each other. If Audio Tag 1 and the management data correspond with each other, the program proceeds to S196 "CHECK Audio Tag 2".

If it is determined that no data is written in "Audio Tag 1" at S190, or if no medium exists at S192, or if Audio Tag 1 and the audio management data do not correspond with each other at S194, the program proceeds to S212 "LCD DISPLAY TIME L-0", and executes the process to display the designated image data only.

At S196, a track number, written in "Audio Tag 2", is read, and an instruction for reading out the track number which is written in "Audio Tag 2" at S198 "RETRIEVE TRACK NUMBER" is transmitted to the audio regeneration device 70 via the communication part. Then, the execution program of the audio regeneration device 70 proceeds to S200 "START AUDIO REGENERATION FROM Audio Tag 3−ivt1", and starts the audio regeneration. After that, at S202 "AUDIO REGENERATION TIME=Audio Tag 3?", when the audio regeneration time corresponds with the time ivt1 after the start of audio regeneration, that is, when the audio regeneration time corresponds with "Audio Tag 3", an instruction for displaying the image of "Image 1" is transmitted to the electronic camera 8 via the communication part.

The electronic camera 8 displays the image of "Image 1" at S214 when ivt1 has passed after the audio regeneration device 70 starts the audio regeneration. Then at S216 "L>itt?", a process is performed for waiting until the image display time L is reached at or passed the itt. As the image display time L reaches at or passed the itt, the program proceeds to S218 "LCD NOT DISPLAYED", and suspends LCD display.

The program then proceeds to determination at S204 "AUDIO REGENERATION TIME>Audio Tag 3+ivt1+ivt2 ?", and waits until the audio regeneration time reaches at "Audio Tag 3+ivt1+ivt2". As the audio regeneration time reaches at "Audio Tag 3+ivt1+ivt2", the program proceeds to S206 "AUDIO REGENERATION COMPLETED", and finishes the audio regeneration.

At S208 "N=T", whether or not the images are displayed by the number which is selected at S180 is determined. In a case where the images are displayed by the selected number (i.e., if N=T), the program proceeds to S210 (END) to finish the subroutine. In a case where the images are not displayed by the selected number (i.e., if N<T), the program returns to S184, and repeatedly executes the process to sequentially perform the next audio regeneration and image display.

Figure 6:
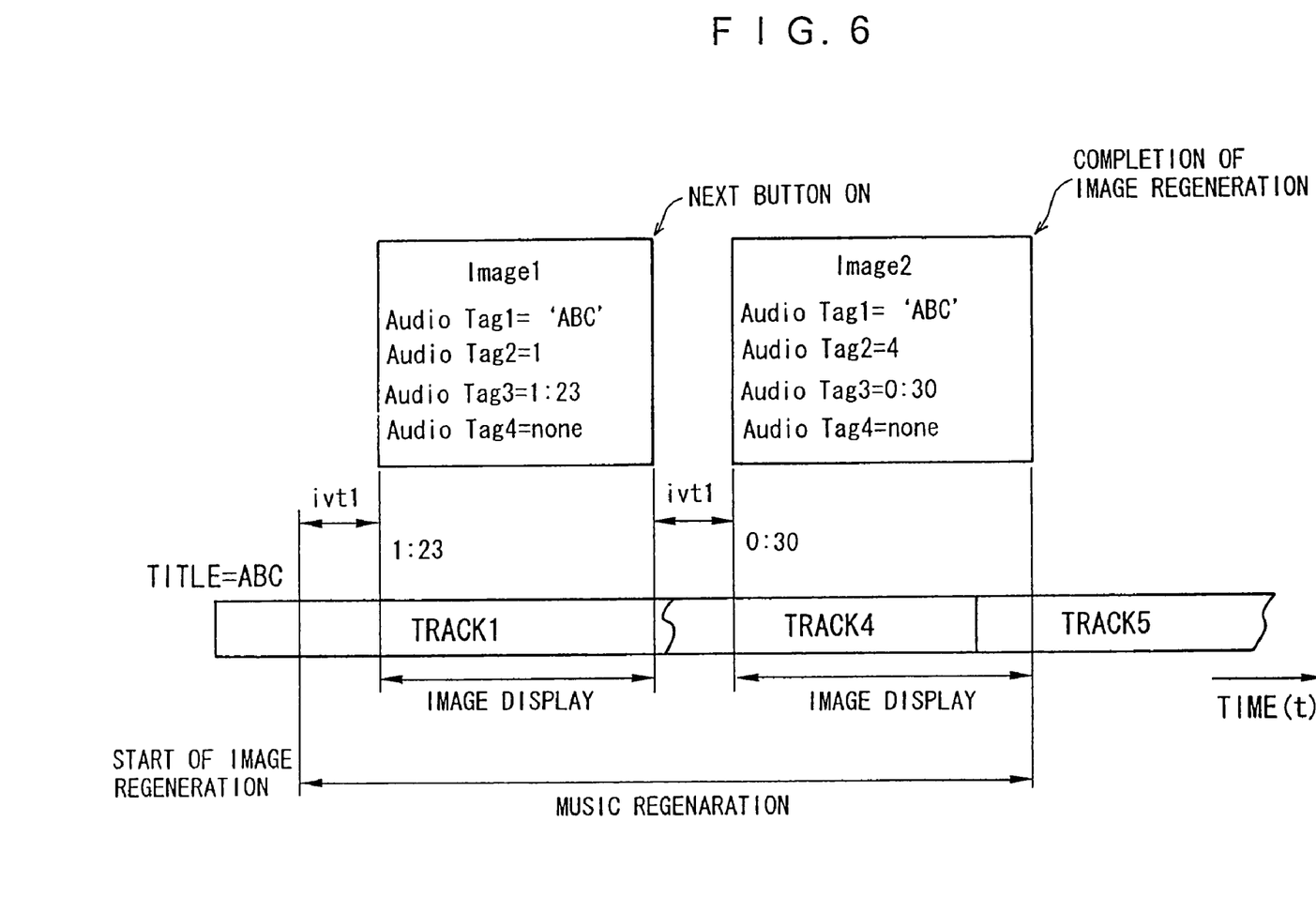
FIG. 6 is a timing chart showing a process for capturing an image during audio regeneration and manually regenerating the recorded image while automatically regenerating sound by using the electronic camera and its recording and regenerating method according to an embodiment of the present invention.
Figure 7:
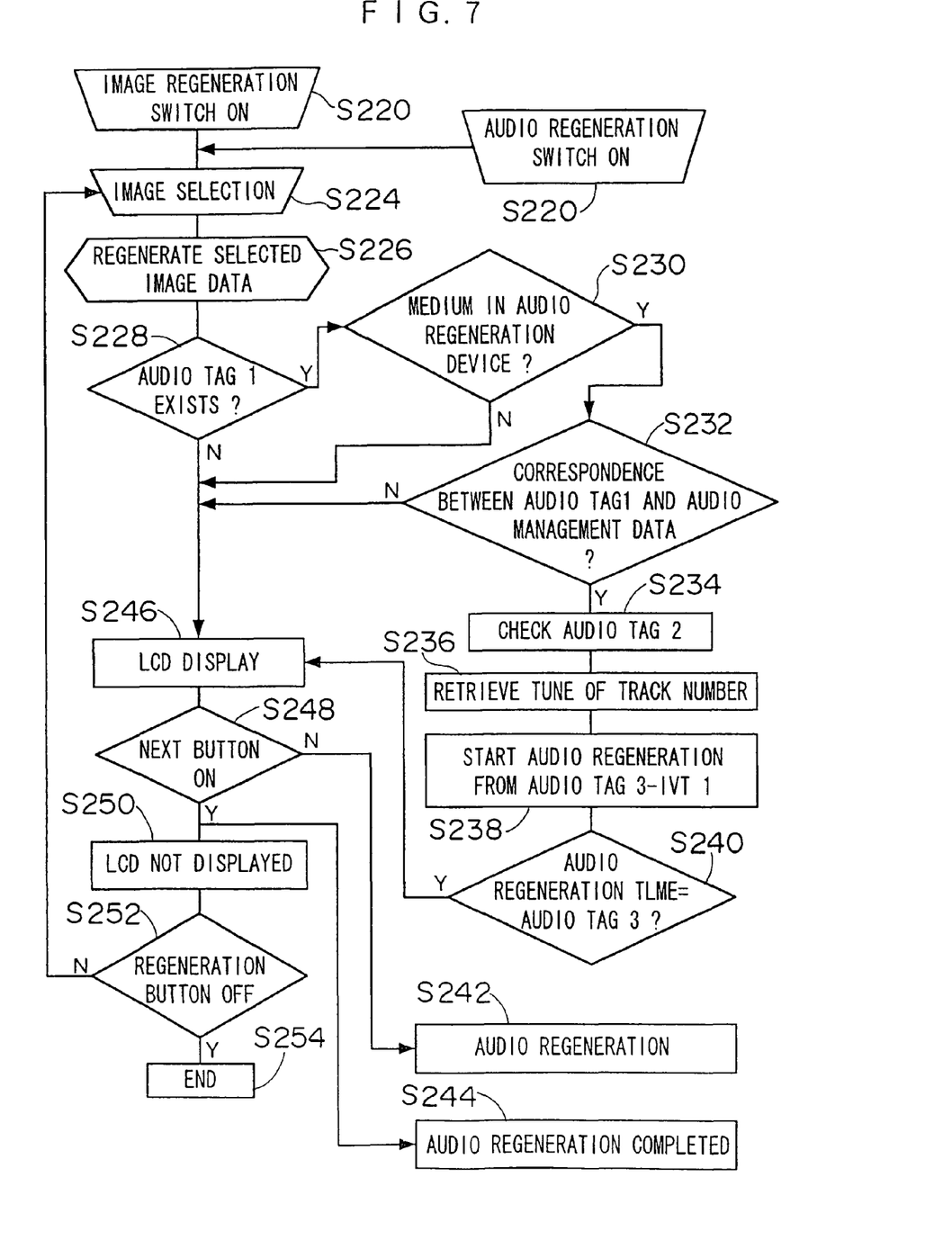
FIG. 7 is a flowchart showing the process for capturing the image during the audio regeneration and manually regenerating the recorded image while automatically regenerating sound by using the electronic camera and its recording and regenerating method according to the embodiment of the present invention.

FIG. 6 is a timing chart showing a process for capturing an image during audio regeneration, and manually regenerating the recorded image while automatically regenerating sound by using the electronic camera according to an embodiment of the present invention. FIG. 7 is a flowchart showing the process. As a mode to manually regenerate the image is designated in the electronic camera 8, the program jumps to the routine in FIG. 7.

In FIG. 6, data to be recorded in the image file of "Image 1" are the title "ABC" in Audio Tag 1, the track number "1" at audio regeneration in Audio Tag 2, and the audio play time "1:23" in Audio Tag 3. The regeneration tune order data, also recorded in "Image 1", is initially recorded in the Audio Tag 4, but nothing is recorded in a case where the image is captured during the audio regeneration. Similarly, the data mentioned above are recorded to the image file of "Image 2" following "Image 1".

As regeneration of music of "TRACK 1" is started, an image of "Image 1" is displayed after a predetermined background audio regeneration time ivt1 . The image is continuously displayed, and the sound simultaneously is being regenerated as background. The image display is completed when the user presses a "NEXT BUTTON" which is provided to the input unit of the electronic camera 8 whereby the audio regeneration and the image display of the "Image 1" are completed. The program moves on to the audio regeneration of the next "TRACK 4", and image display of "Image 2" is performed. The following regeneration of the image and sound is automatically performed in the same manner by pressing the "NEXT BUTTON". To suspend the image display, the user presses an "IMAGE REGENERATION COMPLETION BUTTON" which is provided to the input unit 26 of the electronic camera 8.

In FIG. 7, the image regeneration switch is pressed which is provided to the input unit 26 of the electronic camera 8 at S220 "IMAGE REGENERATION SWITCH ON" and the audio regeneration switch is pressed which is provided to the audio regeneration device 70 at S222 "AUDIO REGENERATION SWITCH ON", thereby audio regeneration start data is transmitted to the electronic camera 8 via the communication part, and the execution program of the electronic camera 8 proceeds to S224 "IMAGE SELECTION".

At S224 "IMAGE SELECTION", an image to be regenerated is selected while referring to a preview screen, then the program proceeds to S226 "REGENERATE SELECTED IMAGE DATA".

At S226, an input from the image regeneration button provided to the electronic camera 8 is in a stand-by state. As the image regeneration button is pressed, regeneration and display of the image are started and the execution program proceeds to S228 "Audio Tag 1 EXISTS?".

At S228 "Audio Tag 1 EXISTS?", whether or not the data is written in "Audio Tag 1" is determined. If it is determined that the data is written in "Audio Tag 1" at S228, the program diverges to S230 "MEDIUM IN AUDIO REGENERATION DEVICE?", and the electronic camera 8 checks via the communication part whether or not the medium exists in the audio regeneration device 70. If the medium exists in the audio regeneration device 70, the program diverges to S232 "CORRESPONDENCE BETWEEN Audio Tag 1 AND AUDIO MANAGEMENT DATA", and the electronic camera 8 checks to the audio regeneration device 70 whether or not Audio Tag 1 and the audio management data correspond with each other. If Audio Tag 1 and the management data correspond with each other, the program proceeds to S234 "CHECK Audio Tag 2".

If it is determined that no data is written in "Audio Tag 1" at S228, or if no medium exists at S230, or if Audio Tag 1 and the audio management data do not correspond with each other at S232, the program proceeds to S246 "DISPLAY LCD", and executes the process to display the designated image data only.

At S234, the track number, written in "Audio Tag 2", is read, and an instruction for reading out the track number which is written in "Audio Tag 2" at S236 "RETRIEVE TUNE OF TRACK NUMBER" is transmitted to the audio regeneration device 70 via the communication part. Then, the execution program of the audio regeneration device 70 proceeds to S238 "START AUDIO REGENERATION FROM Audio Tag 3−ivt1", and starts the audio regeneration. After that, when the audio regeneration time corresponds with the time ivt1 after the start of audio regeneration at S240 "AUDIO REGENERATION TIME=Audio Tag 3?", that is, when the audio regeneration time corresponds with "Audio Tag 3", an instruction for displaying the image of "Image 1" is transmitted to the electronic camera 8 via the communication part.

If ivt1>0, the electronic camera 8 displays the image of "Image 1" at S246 when ivt1 has passed after the audio regeneration device 70 starts the audio regeneration. If ivt1<0, the audio regeneration device 70 starts audio regeneration when ivt1 has passed after displaying the image of "Image 1" at S246. Then at S248, a process is performed to wait until a "NEXT BUTTON" is pressed at S248 "NEXT BUTTON ON". If the "NEXT BUTTON" is not pressed, the electronic camera 8 outputs to the audio regeneration device 70 via the communication part an instruction to continue the audio regeneration, thereby a process of S242 "AUDIO REGENERATION" continues in the execution program of the audio regeneration device 70.

As the "NEXT BUTTON" is pressed, the program proceeds to S250 "LCD NOT DISPLAYED", and suspends the LCD display, then outputs to the audio regeneration device 70 via the communication part an instruction to finish the audio regeneration. In the execution program of the audio regeneration device 70, the process at S244 "AUDIO REGENERATION COMPLETED" is executed.

At S252 "REGENERATION BUTTON OFF", whether or not the regeneration button is OFF is determined. If the regeneration button is not OFF (image regeneration is not completed), the program returns to S224 and the image selection is performed again. If the regeneration button is OFF (image regeneration is completed), the program proceeds to S254 to finish the subroutine.

Figure 8:
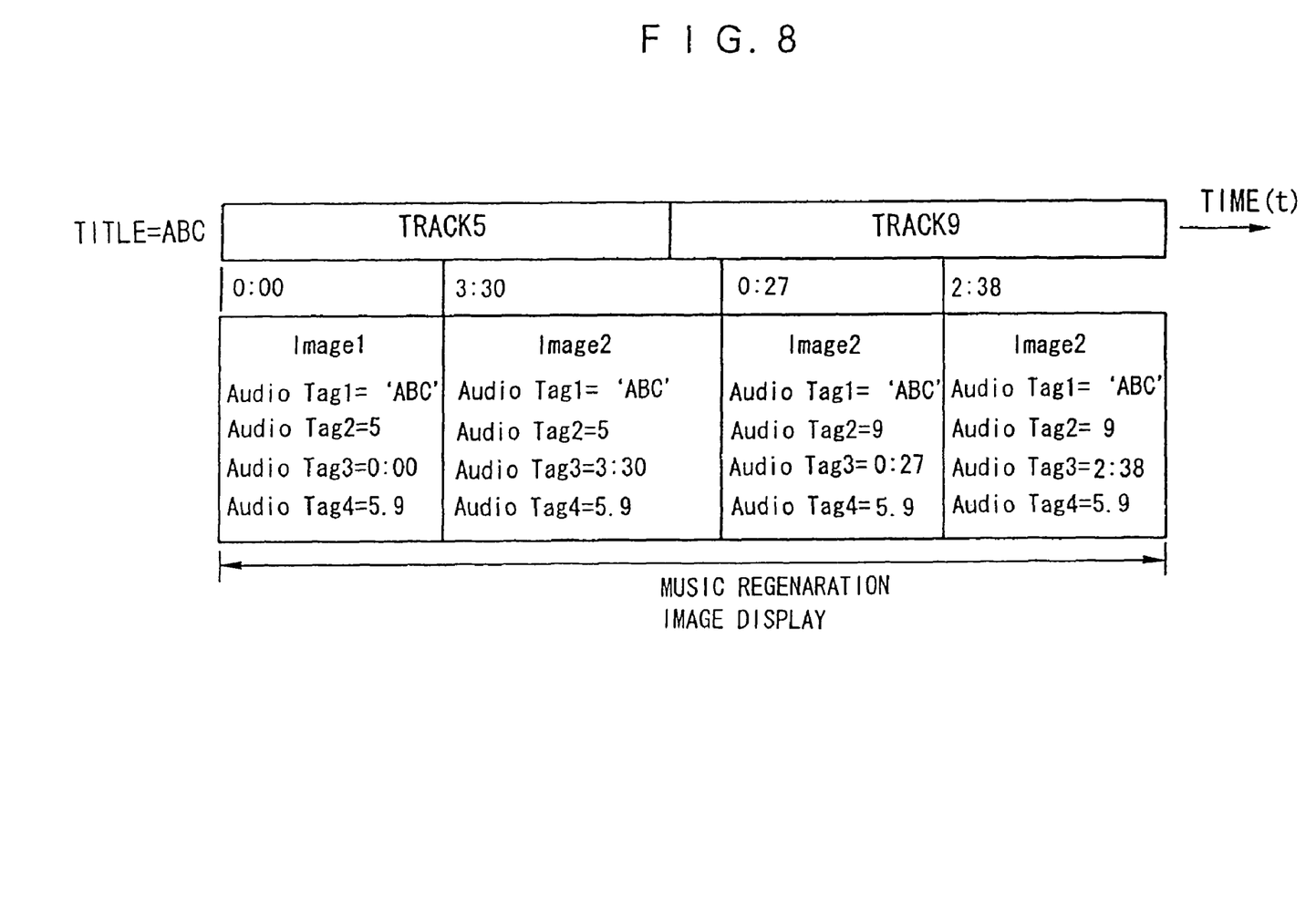
FIG. 8 is a timing chart showing a process for automatically regenerating a captured and recorded image considering a link with audio regeneration while automatically regenerating sound by using the electronic camera and its recording and regenerating method according to an embodiment of the present invention.
Figure 9:
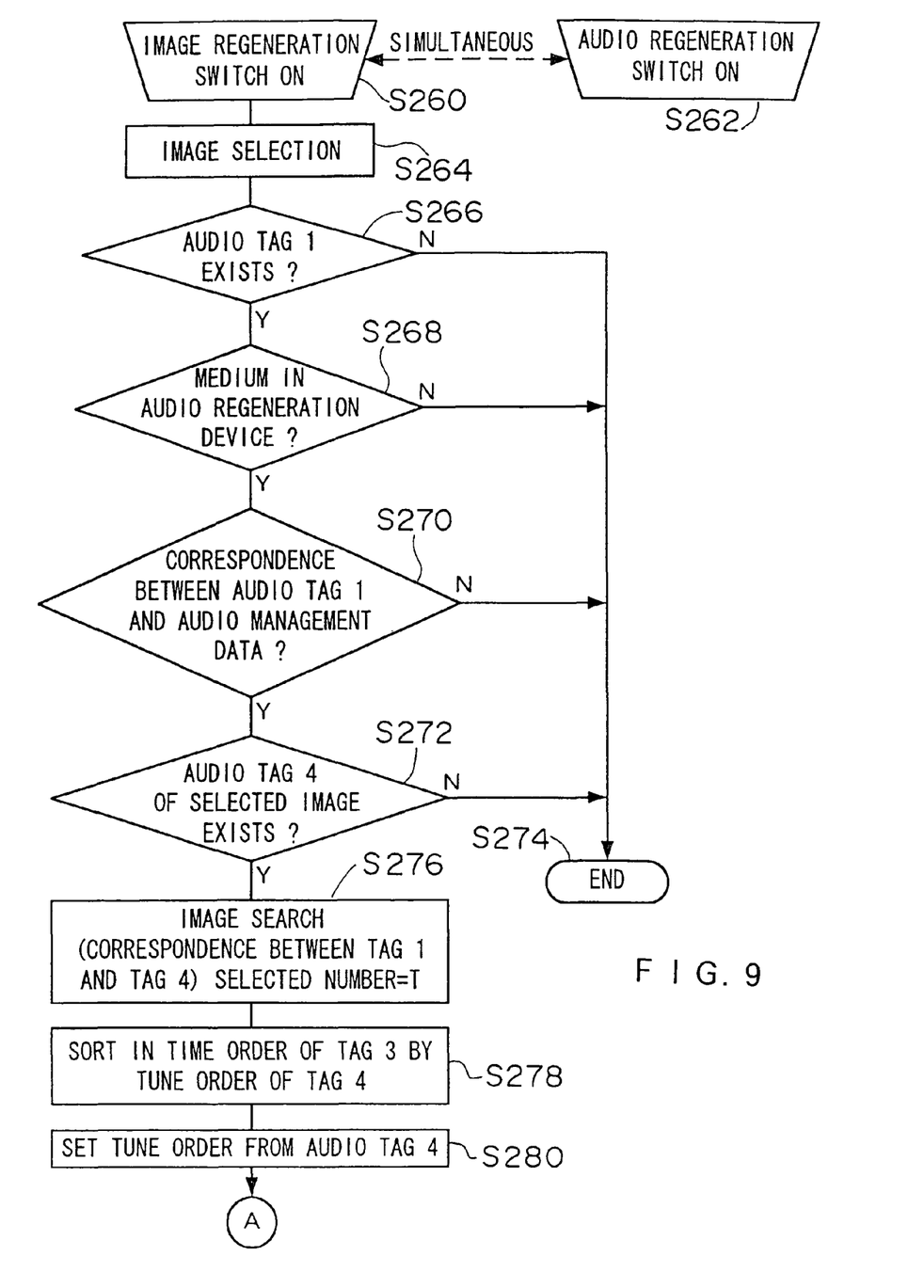
FIG. 9 is a flowchart showing the process for automatically regenerating the captured and recorded image considering the link with the audio regeneration while automatically regenerating sound by using the electronic camera and its recording and regenerating method according to the embodiment of the present invention.
Figure 10:
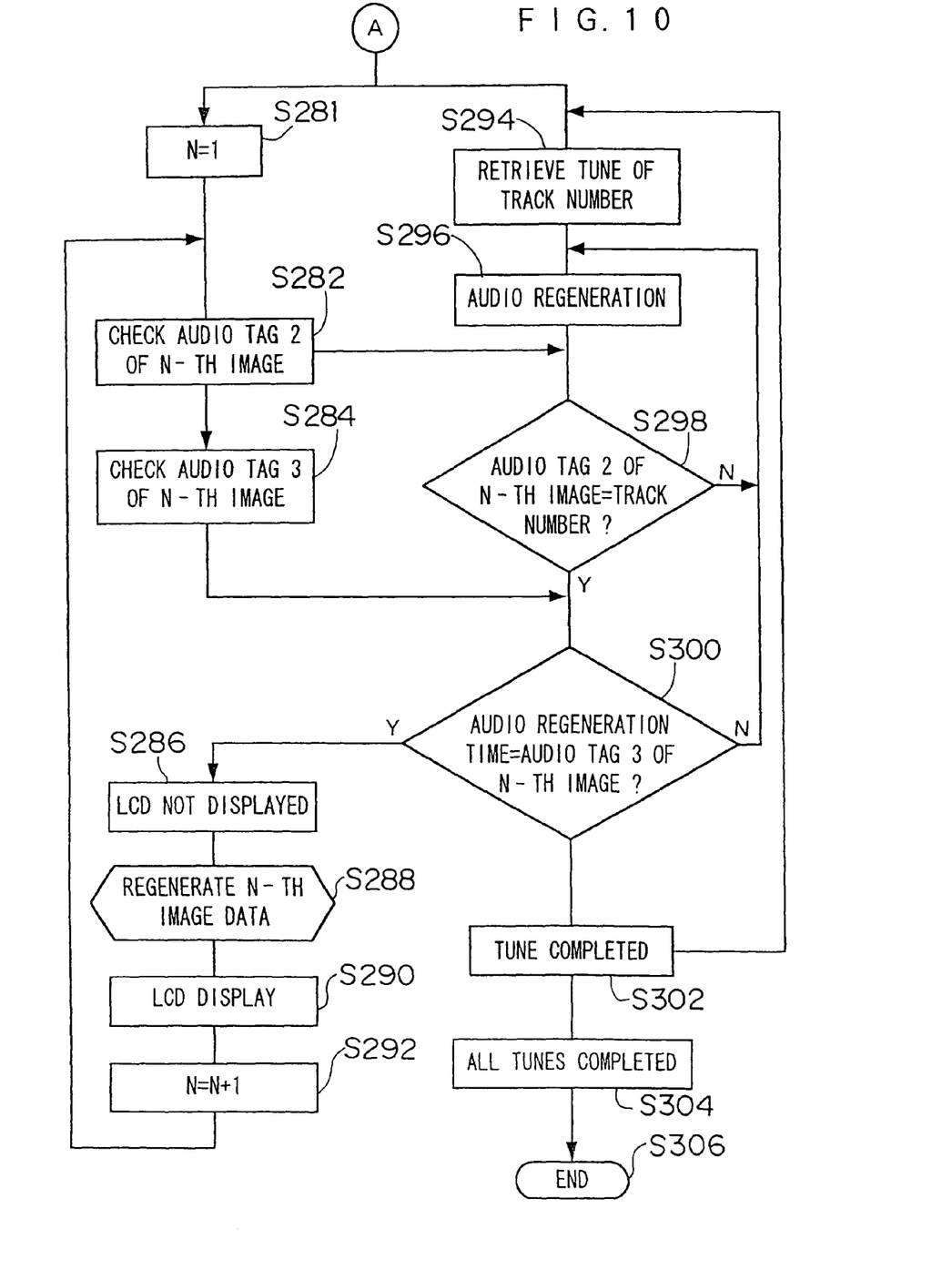
FIG. 10 is a flowchart showing the process for automatically regenerating the captured and recorded image considering the link with the audio regeneration while automatically regenerating sound by using the electronic camera and its recording and regenerating method according to the embodiment of the present invention.

FIG. 8 is a timing chart showing a process for automatically regenerating the image captured and recorded considering a link with the audio regeneration while automatically regenerating sound by using the electronic camera and its recording and regenerating method according to an embodiment of the present invention. FIGS. 9 and 10 are flowcharts showing the process. When an image regeneration mode is designated in the electronic camera 8, the program jumps to the routine in FIG. 9.

In FIG. 8, data to be recorded in an image file of "Image 1" are a title "ABC" in the Audio Tag 1, a track number "5" at audio regeneration in the Audio Tag 2, an audio play start time "0:00" in the Audio Tag 3, and regenerating tune order data in the Audio Tag 4 together with the image data of "Image 1". Similarly, the data mentioned above are recorded also in "Image 2" following "Image 1".

As regeneration of background music of "track 1" is started, the image of "Image 1" is displayed simultaneously. The image is continuously displayed while the sound is regenerated at the background. The image display is completed at the time "3:30" of the Audio Tag 3 which is recorded in the "Image 2". After the time "3:30", the image data of "Image 1" is substituted by "Image 2". Afterward, regeneration of the image and sound is similarly performed automatically.

In FIG. 9, the image regeneration switch which is provided to the input unit 26 of the electronic camera 8 is pressed at S260 "IMAGE REGENERATION SWITCH ON", and at the same time the audio regeneration switch which is provided to the audio regeneration device 70 is pressed at S262 "AUDIO REGENERATION SWITCH ON", thereby the audio regeneration start data is transmitted to the electronic camera 8 via the communication part, and the execution program of the electronic camera 8 proceeds to S264 "IMAGE SELECTION".

An image to be regenerated is selected at S264 "IMAGE SELECTION" while referring to a preview screen, and the program proceeds to S266 "Audio Tag 1 EXISTS?".

At S266 "Audio Tag EXISTS?", whether or not data is written in "Audio Tag 1" is determined. If it is determined that the data is written in "Audio Tag 1" at S266, the program proceeds to S268 "MEDIUM IN AUDIO REGENERATION DEVICE?". If no data is written in "Audio Tag 1", the program diverges to S274 "END" to finish the subroutine.

At S268, the electronic camera 8 checks the communication part whether or not medium exists in the audio regeneration device 70. If the medium exists in the audio regeneration device 70, the program proceeds to S270 "CORRESPONDENCE BETWEEN Audio Tag 1 AND THE AUDIO MANAGEMENT DATA". If no medium exists in the audio regeneration device 70, the program proceeds to the S274 "END" to finish the subroutine.

At S270, the electronic camera 8 checks to the audio regeneration device 70 via the communication part whether "Audio Tag 1" and the audio regeneration data correspond with each other. If the "Audio Tag 1" and the audio regeneration data correspond with each other, the program proceeds to S272 "Audio Tag 4 OF SELECTED IMAGE EXISTS?". If the "Audio Tag 1" and the audio regeneration data do not correspond with each other, the program diverges to S274 "END" to finish the subroutine.

At S272, whether or not data is written in "Audio Tag 4" is determined. If it is determined that the data is written in "Audio Tag 4", the program proceeds to S276 "IMAGE SEARCH (correspondence between Tag 1 and Tag 4 ), SELECTED NUMBER=T". If it is determined that no data is written in "Audio Tag 4", the program diverges to S274 "END" to finish the subroutine, and the process at and after S246 shown in FIG. 7 is executed.

At S276, an image in which "Tag 1" and "Tag 4" correspond with each other is retrieved, and all the retrieved images are determined as images to be regenerated.

At S278 "SORT IN TIME ORDER OF Tag 3 BY TUNE ORDER OF Tag 4", images are sorted in the time order Tag 3 by the tune order Tag 4, and an order of tunes is set at S280 "SET TUNE ORDER FROM Audio Tag 4".

At S280 "N=1", a value which indicates that the first image is being processed is substituted for "N", and the program proceeds to S282 "CHECK Audio Tag 2 OF N-TH IMAGE".

At S282, an instruction to check the track number of the N-th image is outputted to the audio regeneration device 70, and the program proceeds to S284 "CHECK Audio Tag 3 OF N-TH IMAGE".

At S284, an instruction to check the audio regeneration time for the N-th image is outputted to the audio regeneration device 70.

The program for executing control of the audio regeneration device 70 retrieves a track number to be regenerated at S294 "RETRIEVE TUNE OF TRACK NUMBER".

At S296 "AUDIO REGENERATION", the audio data of the designated track number is regenerated. Then at S298 "Audio Tag 2 OF N-TH IMAGE=TRACK NUMBER?", whether or not the designated track number is the track number of the N-th image is determined. If it is determined that the designated track number is the track number of the N-th image, the program proceeds to S300. If it is determined that the designated track number is not the track number of the N-th image, the program returns to S296.

If it is determined at S300 "AUDIO REGENERATION TIME=Audio Tag 3 FOR N?" that the audio regeneration time is not equal with the regeneration time which is recorded in Audio Tag 3 for N, the program returns to S296. If the audio regeneration time reaches at an equal time with the regeneration time which is recorded in Audio Tag 3 for N, the program proceeds to S286 "LCD NOT DISPLAYED" and S302 "TUNE COMPLETED".

In response to the determination at S300 that the audio regeneration time is equal with the regeneration time which is recorded in Audio Tag 3, the image display on the display 56 is suspended at S286. At S288 "REGENERATE N-TH IMAGE DATA", displaying for the next image is prepared, and image display is performed at S290 "DISPLAY LCD". The program proceeds to S292 "N=N+1", and 1 is added to the variable "N" which indicates that the N-th image is processed, then the program returns to S282.

When a tune currently regenerated at S302 is finished, the program returns to S294 so as to regenerate the next tune. If regeneration for all tunes is finished, the program proceeds to S304 "ALL TUNES COMPLETED", and finishes the subroutine at S306 "END".

By the above method, the images are displayed on the LCD whenever Audio Tag 2 and Audio Tag 3 for the selected image correspond with the audio regeneration time and the track number.

As described above, the electronic camera of the present invention records the audio regeneration data which at least indicates where the sound during the audio regeneration is stored in the recording medium together with the captured image data. Therefore, the recorded image and its corresponding sound can be automatically regenerated, so that the image and sound can be easily appreciated simultaneously.

Moreover, in another embodiment, the sound corresponding with the image can be automatically regenerated in accordance with the audio regeneration data which is recorded in the recording medium. Therefore, the image and the sound can be appreciated simultaneously.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed:

1. An electronic camera, comprising:
an image-capturing command reception device which performs reception of an image-capturing command;
an image-capturing device which captures image data representing a subject image upon the reception of the image-capturing command;
a recording device which records the captured image data in a recording medium;
a communication device which performs communication with an audio regenerating device that performs regeneration of sound;
an image-capturing mode selection device which selects one of a normal image-capturing mode and a link image-capturing mode; and
a control device which, upon the reception of the image-capturing command, directs the communication device to start the communication with the audio regenerating device in order to receive audio regeneration data, and directs the recording device to record the received audio regeneration data in the recording medium together with the captured image data, the audio regeneration data indicating a location where the sound being regenerated at the reception of the image-capturing command is stored and indicating an elapsed time period extending between a point of starting the regeneration of the sound and a point of the reception of the image-capturing command,
wherein in a state where the image-capturing mode selection device selects the normal image-capturing mode, upon the reception of the image-capturing command, the control device directs the communication device to start the communication with the audio regenerating device in order to receive the audio regeneration data,
wherein in a state where the image-capturing mode selection device selects the link image-capturing mode, upon the reception of the image-capturing command, the control device directs the communication device to start the communication with the audio regenerating device in order to direct the audio regenerating device to start the regeneration of the sound and in order to receive the audio regeneration data.

2. A recording and regenerating method, comprising the steps of:
regenerating sound through an audio regenerating device in accordance with audio data recorded in a first recording medium;
receiving an image-capturing command;
upon the receiving of the image-capturing command, capturing image data representing a subject image;
when in a normal image-capturing mode, upon the receiving of the image capturing command, receiving audio regeneration data from the audio regenerating device, and
when in a link image-capturing mode, upon the receiving of the image-capturing command, starting the regenerating of the sound through the audio regenerating device and receiving the audio regeneration data from the audio regenerating device,
wherein the audio regeneration data indicates a location where the sound being regenerated at the receiving of the image-capturing command is stored and indicates an elapsed time period extending between a point of starting the regeneration of the sound and a point of the receiving of the image-capturing command;
recording the audio regeneration data received from the audio regenerating device in a second recording medium together with the captured image data; and
regenerating an image in accordance with the image data recorded in the second recording medium, and regenerating the sound that had been being regenerated at the receiving of the image-capturing command concerning the image data, through the audio regenerating device in accordance with the audio regeneration data recorded together with the image data,
wherein the first recording medium and the second recording medium are identical.

3. The recording and regenerating method as defined in claim 2, wherein:
the regenerating of the sound in accordance with the audio regeneration data starts at a predetermined time before an end point of the elapsed time period; and
the regenerating of the image starts at the end point of the elapsed time period.

4. The recording and regenerating method as defined in claim 2, wherein:
the audio regeneration data indicates an order of the regenerating of the sound;
the regenerating of the sound in accordance with the audio regeneration data is successively performed by following the order of the regeneration; and
in the regenerating of the image, the image is regenerated by successively changing a corresponding piece of the image whenever reaching at the end point of the elapsed time period.

5. A recording and regeneration method, comprising the steps of:
regenerating sound through an audio regenerating device in accordance with audio data recorded in a first recording medium;
receiving an image-capturing command;
upon the receiving of the image-capturing command, capturing image data representing a subject image;
when in a normal image-capturing mode, upon the receiving of the image capturing command, receiving audio regeneration data from the audio regenerating device, and
when in a link image-capturing mode, upon the receiving of the image-capturing command, starting the regenerating of the sound through the audio regenerating device and receiving the audio regeneration data from the audio regenerating device,
wherein the audio regeneration data indicates a location where the sound being regenerated at the receiving of the image-capturing command is stored and indicates an elapsed time period extending between a point of starting the regenerating of the sound and a point of the receiving of the image-capturing command;
recording the audio regeneration data received from the audio regenerating device in a second recording medium together with the captured image data; and
regenerating an image in accordance with the image data recorded in the second recording medium, and regenerating the sound that has been being regenerated at the receiving of the image-capturing command concerning the image data, through the audio regenerating device in accordance with the audio regeneration data recorded together with the image data wherein:
the regenerating of the sound in accordance with the audio regeneration data starts at a predetermined time before an end point of the elapsed time period; and the regenerating of the image starts at the end point of the elapsed time period.

6. A recording and regenerating method, comprising the steps of:

regenerating sound through an audio regenerating device in accordance with audio data recorded in a first recording medium;

receiving an image-capturing command;

upon the receiving of the image-capturing command, capturing image data representing a subject image;

upon the receiving of the image-capturing command, receiving audio regeneration data from the audio regenerating device, the audio regeneration data indicating a location where the sound being regenerated at the receiving of the image-capturing command is stored and indicating an elapsed time period extending between a point of starting the regenerating of the sound and a point of the receiving of the image-capturing command;

recording the audio regeneration data received from the audio regenerating device in a second recording medium together with the captured image data; and regenerating an image in accordance with the image data recorded in the second recording medium, and regenerating the sound that has been being regenerated at the receiving of the image-capturing command concerning the image data, through the audio regenerating device in accordance with the audio regeneration data recorded together with the image data, wherein:

the audio regeneration data indicates an order of the regenerating of the sound:

the generating of the sound in accordance with the audio regeneration data is successively performed by following the order of the regenerating; and in the regenerating of the image, the image is regenerated by successively changing a corresponding piece of the image whenever reaching at the end point of the elapsed time period.

* * * * *